F. J. COLE.
LOCOMOTIVE TRAILING TRUCK.
APPLICATION FILED APR. 29, 1919.
1,316,143.
Patented Sept. 16, 1919.
8 SHEETS—SHEET 1.
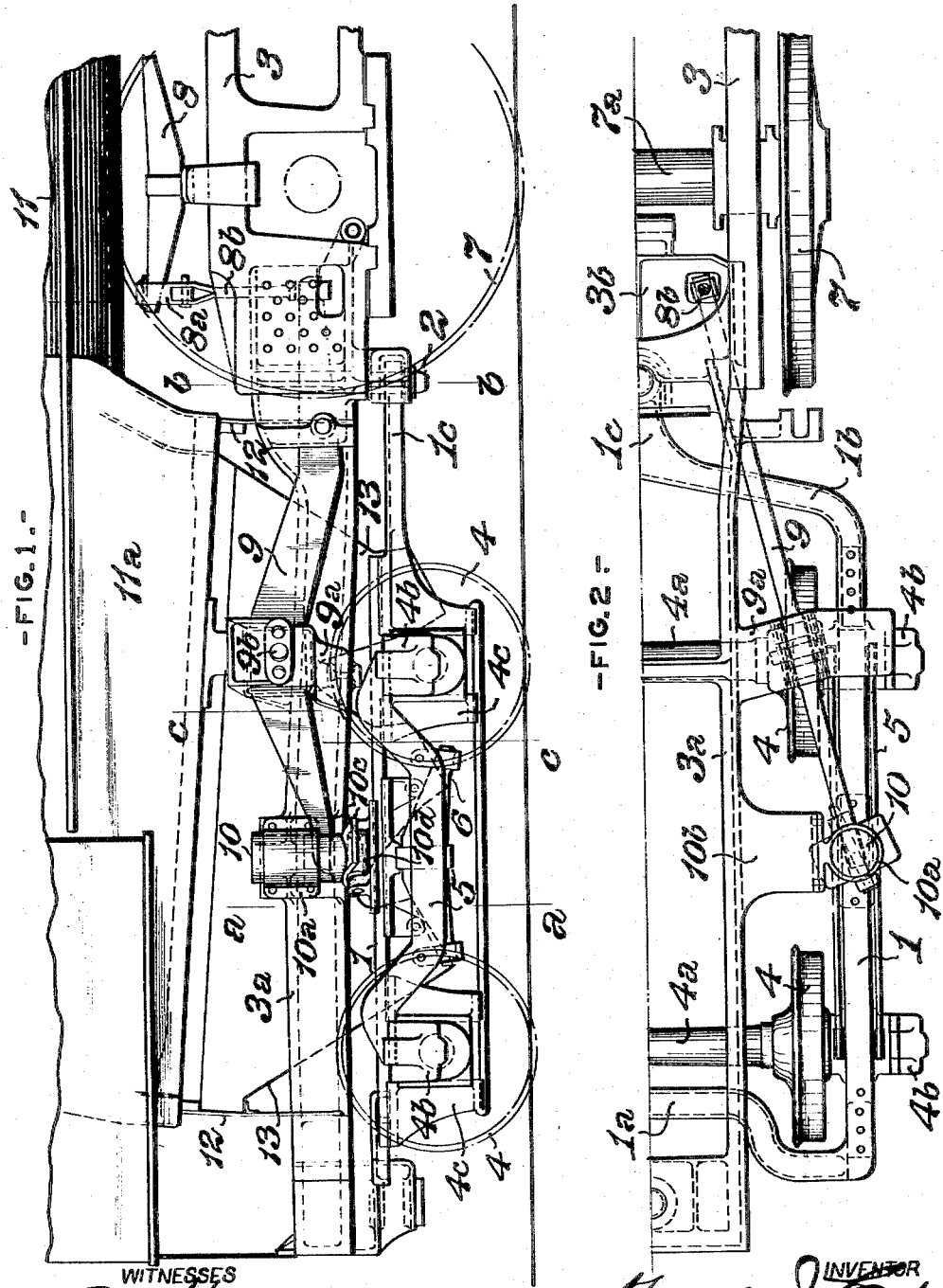
WITNESSES
INVENTOR
Francis J. Cole

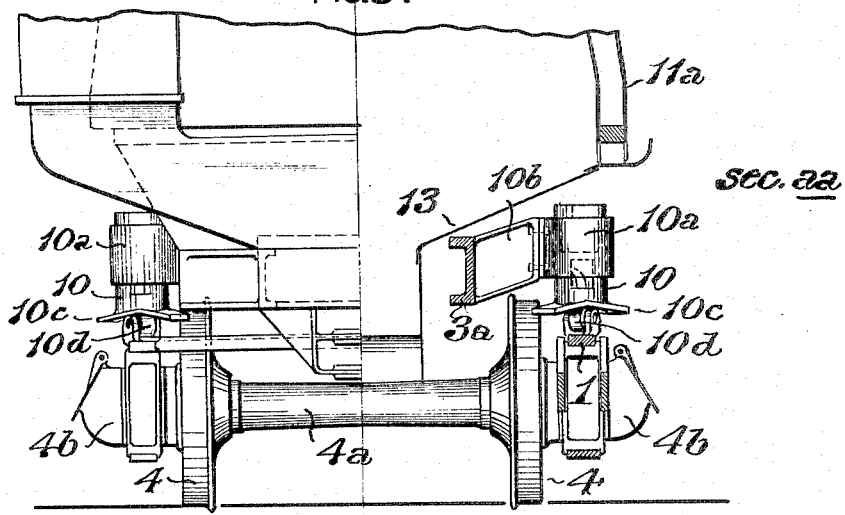
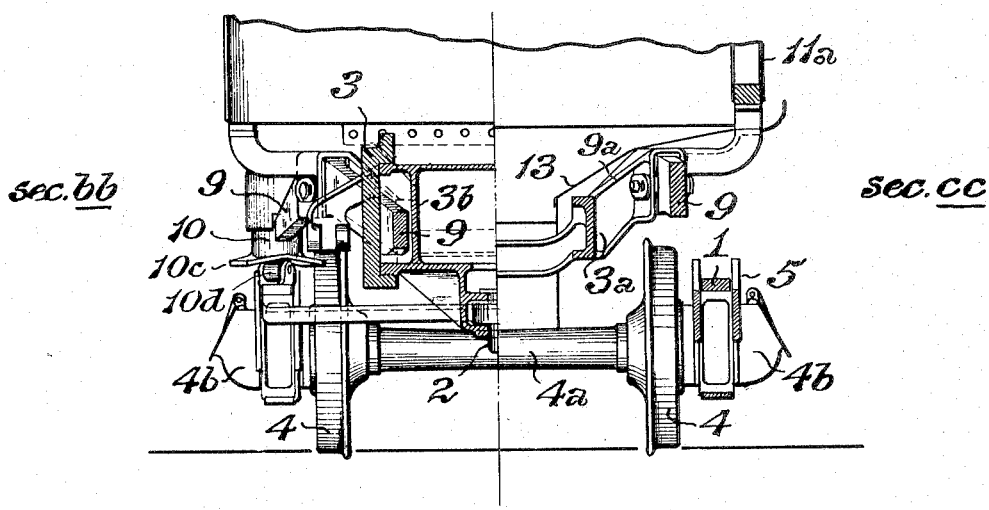

F. J. COLE.
LOCOMOTIVE TRAILING TRUCK.
APPLICATION FILED APR. 29, 1919.
1,316,143.
Patented Sept. 16, 1919.
8 SHEETS—SHEET 3.
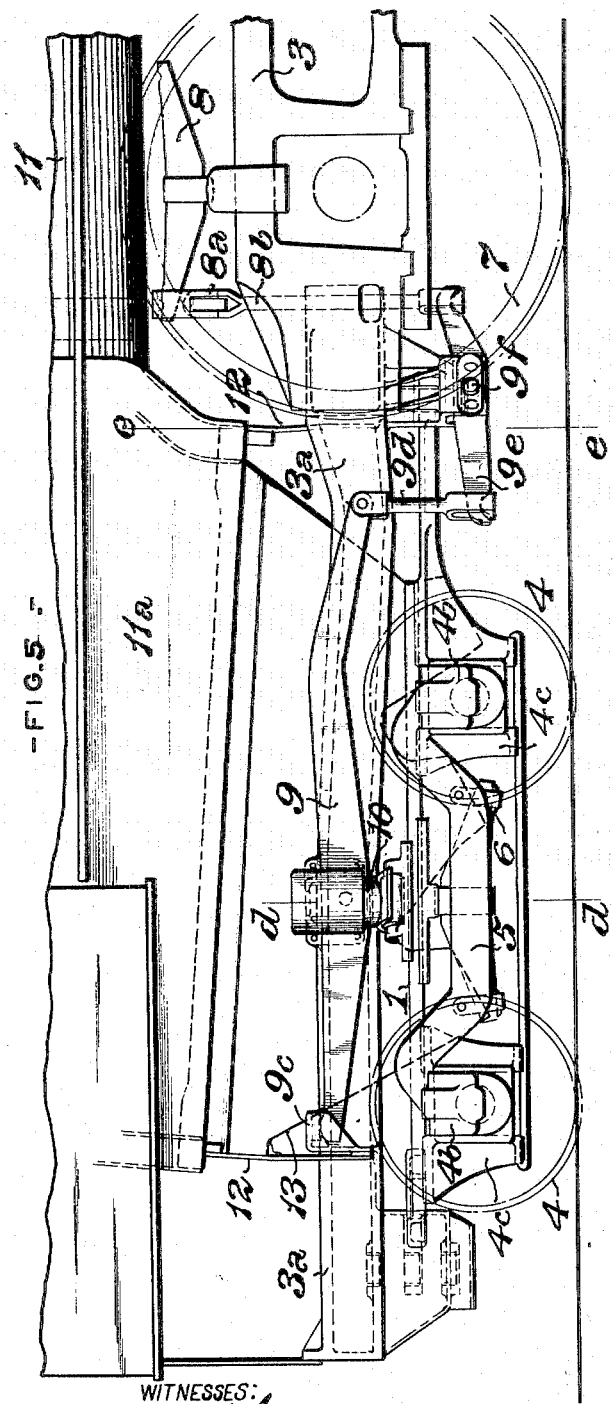
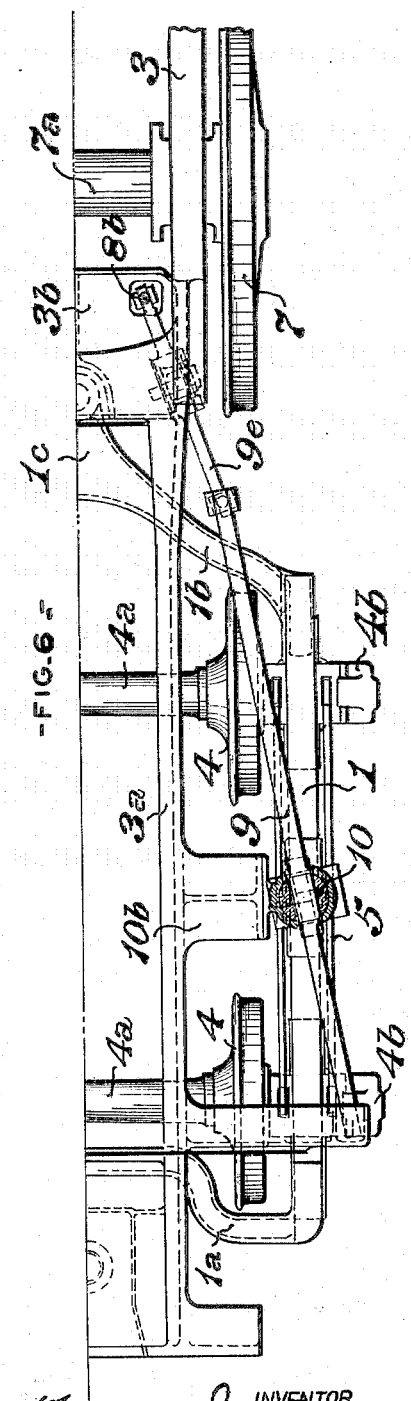

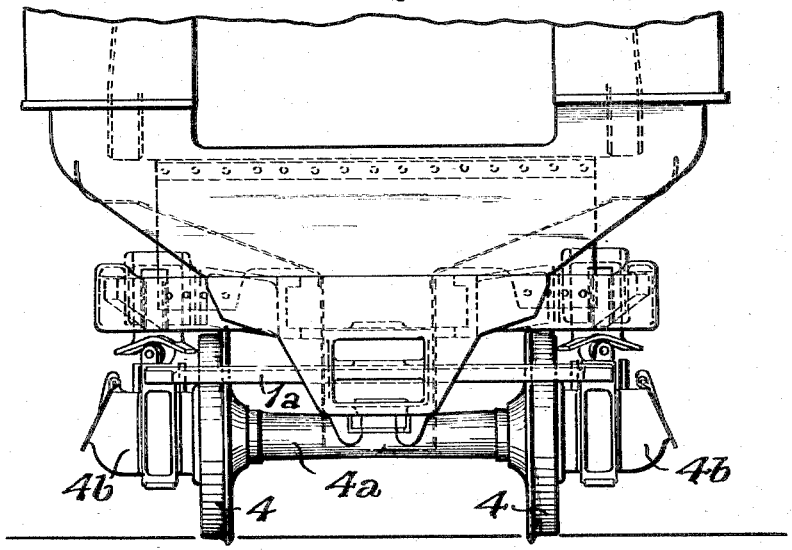
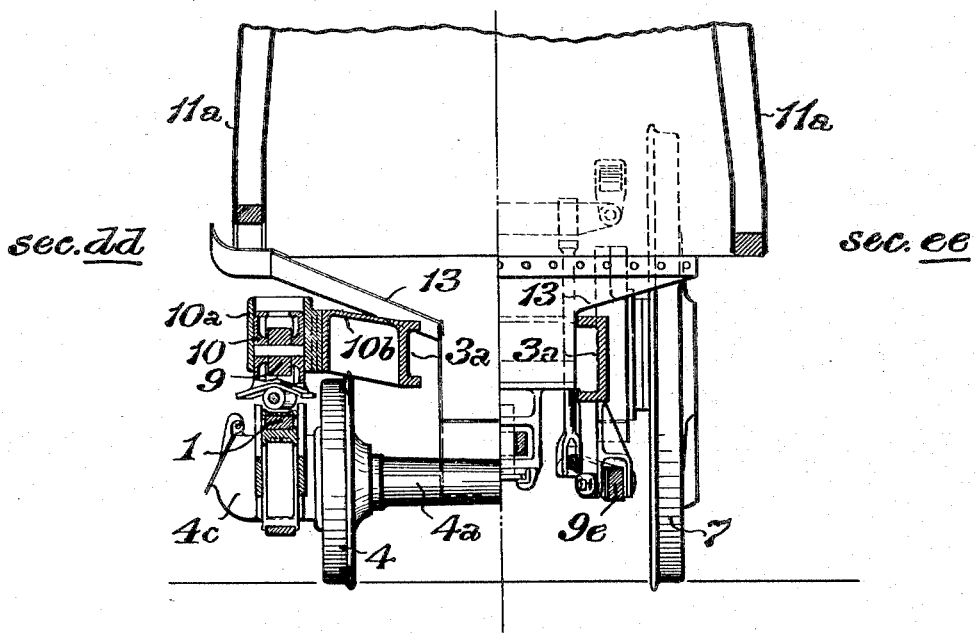

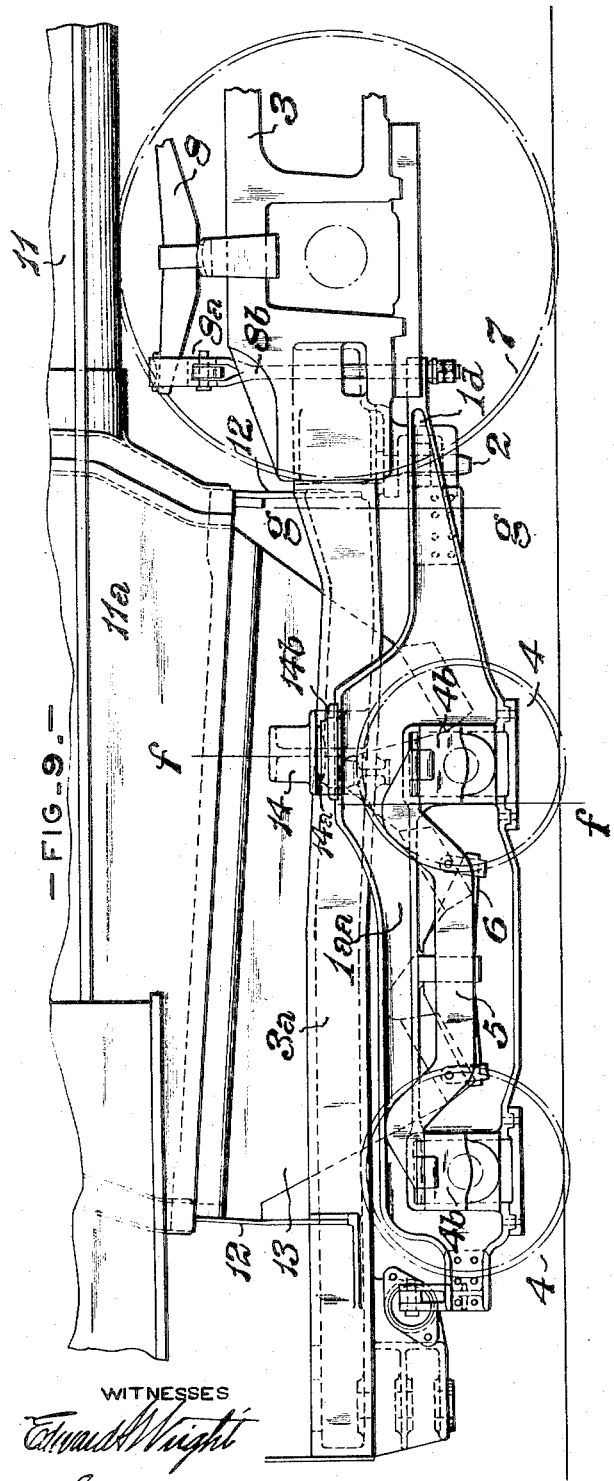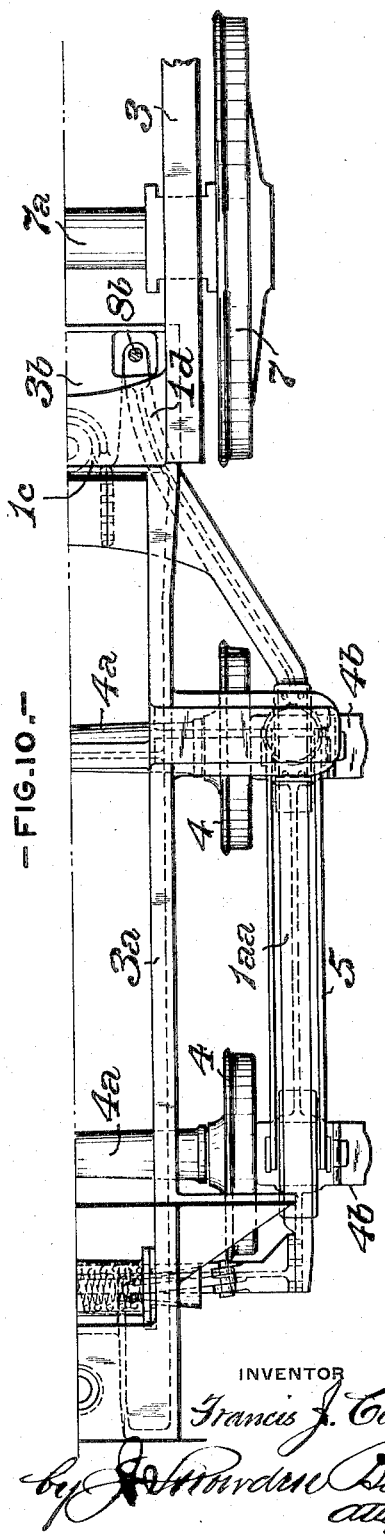

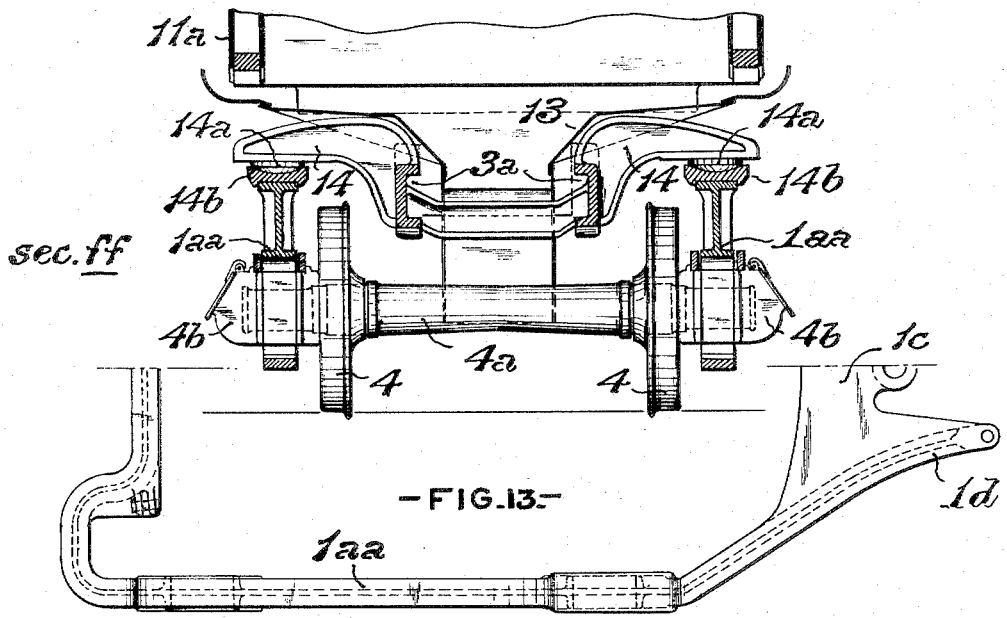
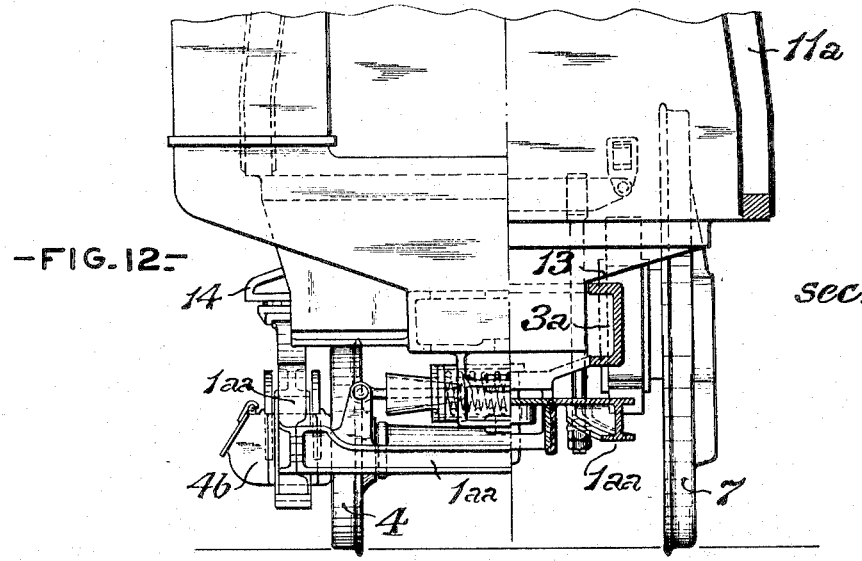

F. J. COLE.
LOCOMOTIVE TRAILING TRUCK.
APPLICATION FILED APR. 29, 1919.
1,316,143.
Patented Sept. 16, 1919.
8 SHEETS—SHEET 7.
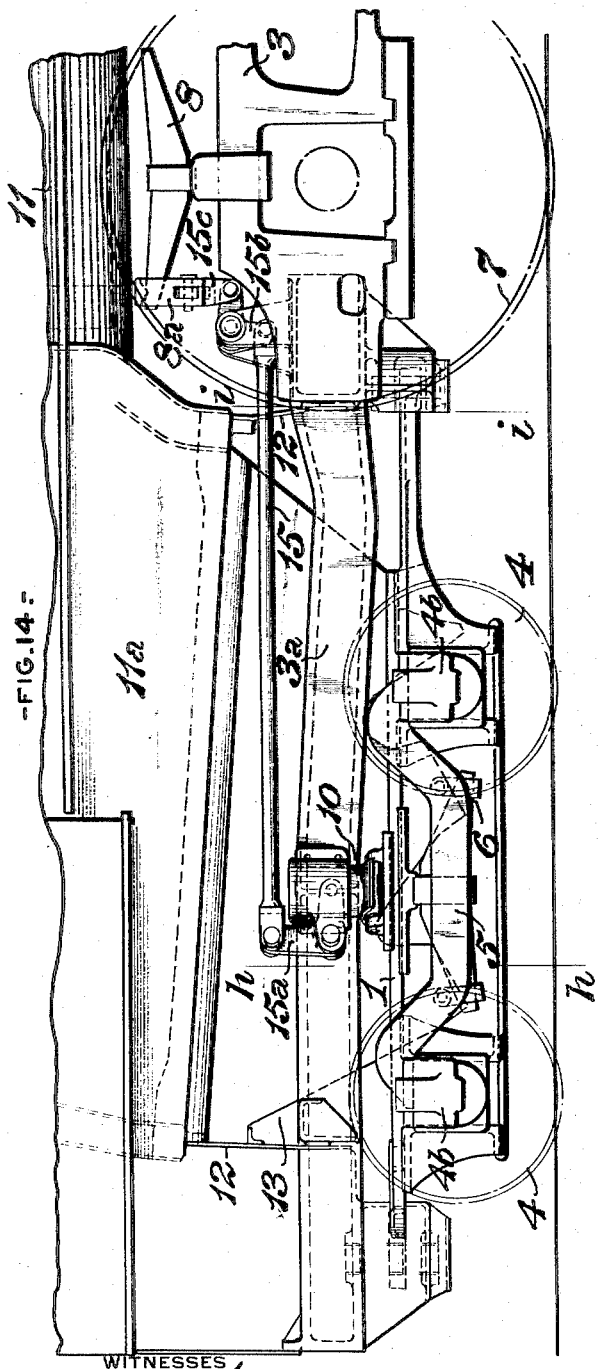
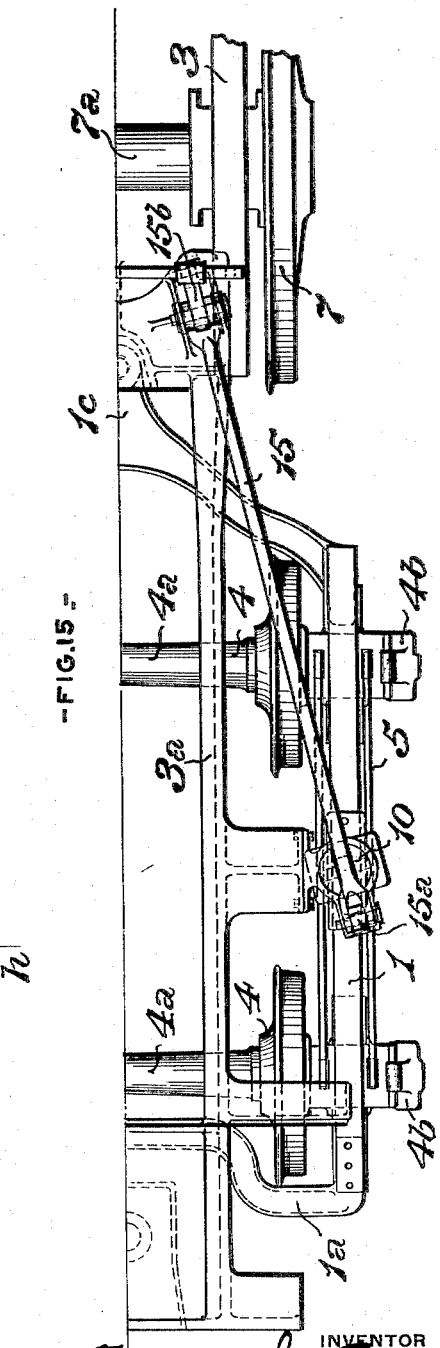

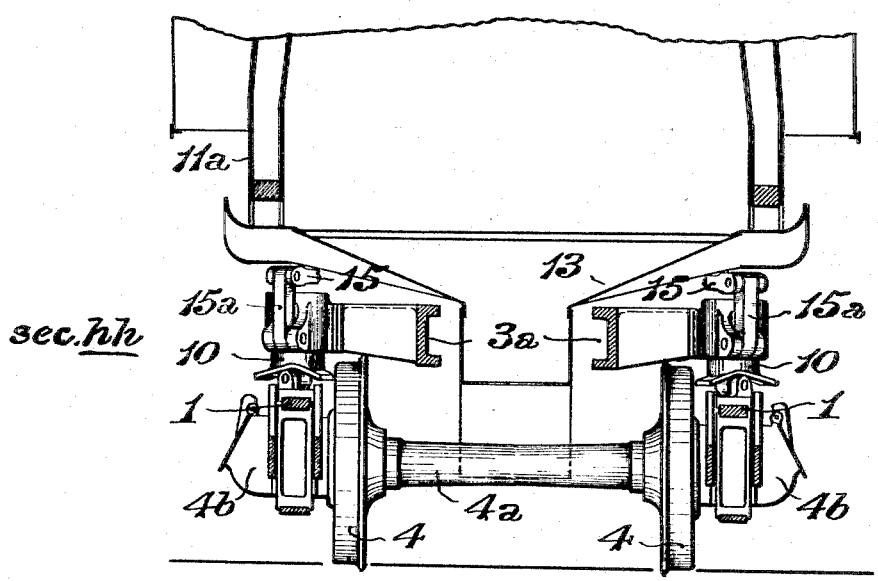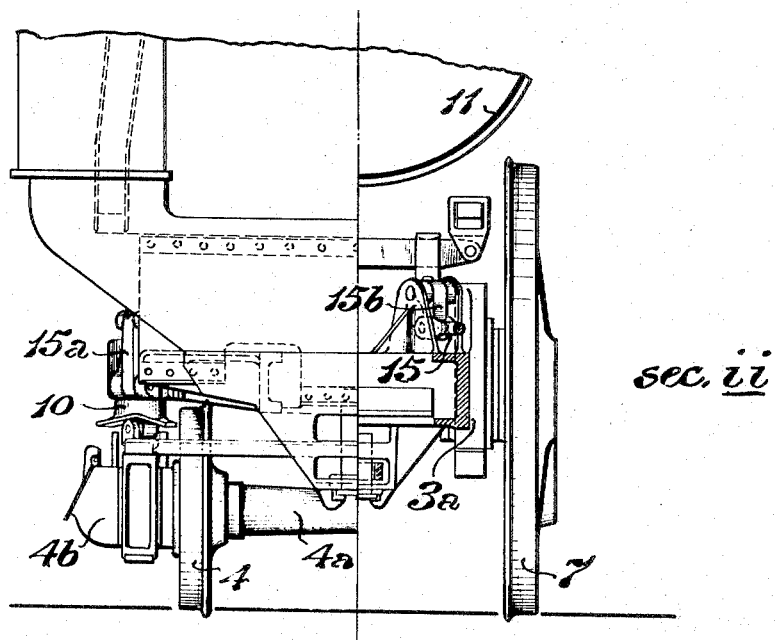

UNITED STATES PATENT OFFICE.

FRANCIS J. COLE, OF SCHENECTADY, NEW YORK.

LOCOMOTIVE TRAILING TRUCK.

1,316,143.   Specification of Letters Patent.   Patented Sept. 16, 1919.

Application filed April 29, 1919. Serial No. 293,429.

*To all whom it may concern:*

Be it known that I, FRANCIS J. COLE, of Schenectady, in the county of Schenectady and State of New York, have invented a certain new and useful Improvement in Locomotive Trailing Trucks, of which improvement the following is a specification.

The object of my invention is to provide a four wheeled trailing truck, which may be located below the fire-box of a locomotive, in proper relation thereto, to support the over-hanging weight in rear of the driving wheels, without involving any change in the general design of the fire-box, ash-pan, or accessories, as heretofore constructed, in standard practice, or any substantial detail modification of the ash pan.

The improvement claimed is hereinafter fully set forth.

In the accompanying drawings: Figure 1 is a side view, in elevation, of the rear portion of a locomotive engine, illustrating an embodiment of my invention; Fig. 2, a half plan view, with the firebox removed; Fig. 3, a view, the left hand half of which is a rear elevation, and the right hand half, a vertical transverse section, on the line $a\ a$ of Fig. 1; Fig. 4, a view, the left hand half of which is a similar section, on the line $b\ b$ of Fig. 1, and the right hand half, a similar section, on the line $c\ c$ of Fig. 1; Fig. 5, a view, similar to Fig. 1, illustrating a structural modification; Fig. 6, a half plan view of the same, with the firebox removed; Fig. 7, a rear view, in elevation; Fig. 8, a view, the left hand half of which is a vertical transverse section, on the line $d\ d$ of Fig. 5, and the right hand half, a similar section, on the line $e\ e$ of Fig. 5; Fig. 9, a view, similar to Fig. 1, illustrating another structural modification; Fig. 10, a half plan view of the same, with the firebox removed; Fig. 11, a vertical transverse-section, on the line $f\ f$ of Fig. 9; Fig. 12, a view, the left hand half of which is a rear elevation, and the right hand half, a vertical transverse section, on the line $g\ g$ of Fig. 9; Fig. 13, a half plan view of the truck frame of Figs. 9 to 12 inclusive; Fig. 14, a view, similar to Fig. 1, illustrating a further structural modification; Fig. 15, a half plan, with the firebox removed; Fig. 16, a vertical transverse section, on the line $h\ h$ of Fig. 14; and, Fig. 17, a view, the left hand half of which is a rear elevation, and the right hand half, a vertical transverse section, on the line $i\ i$ of Fig. 14.

In the practice of my invention, referring descriptively to the specific embodiment thereof which is herein exemplified, and first to the form shown in Figs. 1 to 4 inclusive, I provide a truck frame comprising two parallel side members, 1, 1, a transverse rear member, $1^a$, and a transverse front member, $1^b$, the latter being forwardly inclined from the side members to the longitudinal central plane of the truck and having a forwardly projecting radius bar, $1^c$, at its middle socketed to receive a center pin. The members of the truck frame are rigidly secured together, and the radius bar $1^c$, is coupled by a center pin, 2, to a cross tie, $3^b$, secured to the side members, 3, of the main frame of the locomotive, and to the supplemental frame members, $3^a$, which extend rearwardly therefrom, above the truck frame.

The truck is supported on two pairs of truck wheels, 4, which pairs of wheels are fixed on two truck axles, $4^a$, journaled in axle boxes, $4^b$, fitted, in the usual manner, in pedestals, $4^c$, fixed to the side members of the truck frame. By reference to Fig. 2, it will be seen that, except as to the two truck axles, the space inside the truck frame is entirely open and unobstructed by transverse members, and, therefore, that any suitable and preferred form of ash pan may be located above it. The weight carried by the truck frame acts upon the axle boxes through truck equalizers, 5, which bear, at their ends, on the axle boxes, and are coupled to the ends of springs, 6, on which the side members of the truck frame bear.

The rear driving wheels, 7, of the locomotive, are fixed on an axle, $7^a$, which is fitted in boxes in the main frame, 3, in the ordinary manner, the supported weight being transmitted to the driving boxes through springs, 8. The truck, as a whole, is equalized with the rear driving wheels by main equalizers, 9, which are located in forwardly and inwardly inclined positions above the truck frame, and are journaled by pins, $9^b$, in the outer ends of upwardly and outwardly inclined post supports, $9^a$, fixed on the supplemental engine frames, $3^a$. The forward ends of the equalizers are coupled to the lower ends of links, $8^b$, the upper ends of which are, in turn, coupled to the rear spring hangers, $8^a$, of the driving wheel springs, 8. The rear end of each of the main equalizers, 9, bears on a resistance device for controlling the swinging movements of the truck, which may be of any suitable and preferred known type, and, in the instance shown, comprises a cylindrical transmission block, 10, in which the rear end of the equalizer is fitted, and which is itself fitted to move vertically in a guide, 10$^a$, secured to, and supported by, an upwardly and outwardly projecting bracket, 10$^b$, on the supplemental engine frame, 3$^a$. The lower end of the block, 10, carries a shoe, 10$^c$, the lower face of which is downwardly inclined, in opposite directions, and bears on a roller, 10$^d$, journaled, in a horizontal plane, on the adjacent side member, 1, of the truck frame. Swinging movement of the truck, in either direction is resisted by the frictional resistance between the roller and shoe, and the inclined surfaces of the latter act to return the truck to normal central position, when passing from a curve to a tangent of the track.

The firebox, 11$^a$, of the boiler, 11, is supported, on the supplemental engine frame members, 3$^a$, in any suitable and preferred manner, as by front and rear expansion plates, 12, and the space below it being, as before stated, unobstructed by any transverse members of the truck, other than its axles, an ash pan, 13, having any desired number and arrangement of hoppers, may be applied.

The structural modification shown in Figs. 5 to 8 inclusive, substantially accords, in general principle, and as to the form of the truck frame and its relation to the main frame and firebox, with the construction above described, and differs, in structural detail, therefrom, as to the connection of the main equalizers, 9, with the truck frame, and rear driving axle, as now to be described. In this instance, each of the said equalizers is journaled on the cylindrical transmission block, 10, of the resistance mechanism, which mechanism is similar to that first described, instead of on a post support independent thereof as in the first described construction. The rear end of the equalizer, 9, bears on an abutment, 9$^c$, fixed to the adjacent supplemental engine frame, 3$^a$, and its forward end is coupled to the upper end of a link, 9$^d$, the lower end of which is, in turn, coupled to one end of a supplemental equalizer, 9$^e$, journaled in a bearing, 9$^f$, on the main engine frame, and having its opposite end coupled to a link, 8$^b$, which is connected to the rear spring hangers, 8$^a$, of the driving wheel spring, 8. The application of the supplemental equalizer, 9$^e$, enables the length of the main equalizer to be kept within desirable limits, and facilitates its connection with the driving spring.

Figs. 9 to 13 inclusive, illustrate a further structural modification, the characteristic feature of which is a truck frame which is of integral construction, and itself performs the function of the main equalizers of the constructions before described, thereby enabling them to be dispensed with. As most clearly indicated in Figs. 10 and 13, the truck frame, 1$^{aa}$, is an integral casting, of substantially rectangular form in plan, and having a radius bar, 1$^c$, at the middle of its forward end, for connection to a center pin, as in the prior examples of the invention. The truck frame is, as before, supported on two truck axles, and their wheels, and is journaled on the supplemental engine frame members, 3$^a$, in a plane nearly in line with that of the forward truck axle. As shown in Fig. 11, laterally projecting arms, 14, are formed on, or fixed to, the supplemental frame members, 3$^a$, said arms having spherical faced plates, 14$^a$, near their outer ends, fitting corresponding recesses in shoes, 14$^b$, which rest on the tops of the side members of the truck frame. By this construction, movement of the truck frame relatively to the engine frame, in both a vertical and a horizontal plane is provided for. The forward end of the truck frame is coupled, in its central longitudinal plane, to the main frame, by a center pin, 2, passing through a radius bar, 1$^c$, as in the instances before described, and the truck frame is coupled, in the manner of an equalizer, to the rear spring hangers, 8$^a$, of the rear driving wheels, by rods, 8$^b$, passing through sockets in lateral arms, 1$^d$, projecting forwardly from the truck frame, on opposite sides of the radius bar.

Lateral movement of the truck frame is controlled and its return to normal central position effected, when passing from a curve to a tangent of the truck, by a spring centering mechanism which is indicated at the left hand side of Fig. 12, and which is substantially similar to that disclosed in Letters Patent of the United States No. 773,713, granted and issued to American Locomotive Company, as my assignee, under date of November 1, 1904. Inasmuch as said mechanism does not, in and of itself, form part of my present invention, and as any other suitable and preferred form of centering mechanism, may be applied to perform its function, it need not be herein in detail described.

Figs. 14 to 17 inclusive, illustrate another structural modification in which, as in the construction shown in Figs. 1 to 8 inclusive, the overhanging weight of the locomotive which is supported by the truck, is applied to the frame thereof in a plane midway between those of the truck axles, but in which another means of equalizing the truck wheels and rear driving wheels is provided. In this instance, a friction resistance device similar to that described and shown in connection with the constructions of Figs. 1 to 8 inclusive, is applied on each side member of the truck frame, and the truck is equalized with the rear driving wheels by tension rods, 15, the rear end of each of which is coupled, by a bell crank, 15ª, to the transmission block, 10, of the adjacent resistance device, and the forward end is coupled, by a similar bell crank, 15ᵇ, to a short link, 15ᶜ, which is, in turn, coupled to the rear spring hanger, 8ª, of the rear driving spring, 8, on that side of the locomotive.

The several forms of the invention which are herein described and shown, all of which embody the same general structural and operative principles, are all readily adaptable in locomotives of the present standard constructions, in which rear overhanging weight is carried on wheels which are not driving wheels, and it will be obvious to those familiar with locomotive construction, that their application involves no obstruction to the ash pan or modification of the standard forms and dimensions thereof.

I claim as my invention and desire to secure by Letters Patent:—

1. In a locomotive engine, the combination of a main frame; driving wheels journaled in bearings therein; a boiler supported on the main frame and having its firebox back of the rear driving wheels; a four wheeled truck located below the firebox and having a frame which is entirely unobstructed between the truck axles; springs, to each of which weight is imparted from a side member of the truck frame; equalizers through which weight is transmitted from said springs to the journal boxes of the truck axles; and a center pin, coupling the front of the truck frame to the main frame.

2. In a locomotive engine, the combination of a main frame; driving wheels journaled in bearings therein; a boiler supported on the main frame and having its firebox back of the rear driving wheels; a four wheeled truck located below the firebox, and coupled, at its front end, to the main frame; springs, to each of which weight is imparted from a side member of the truck frame; equalizers through which weight is transmitted from said springs to the journal boxes of the truck axles; a resistance device mounted on the truck frame for controlling the swinging movements of the truck, and returning it to normal central position; and equalizing mechanism bearing on said resistance device and adapted to transfer weight from the main frame to the truck frame.

3. In a locomotive engine, the combination of a main frame; driving wheels journaled in bearings therein; a boiler supported on the main frame and having its firebox back of the rear driving wheels; a four wheeled truck located below the firebox, and coupled, at its front end, to the main frame; springs, to each of which weight is imparted from a side member of the truck frame; equalizers through which weight is transmitted from said springs to the journal boxes of the truck axles; a resistance device mounted on the truck frame for controlling the swinging movements of the truck and returning it to normal central position; equalizing mechanism bearing on said resistance device; and intermediate connections coupling said equalizing mechanism to the rear driving wheel springs.

4. In a locomotive engine, the combination of a main frame; driving wheels journaled in bearings therein; a boiler supported on the main frame and having its firebox back of the rear driving wheels; a four wheeled truck, located below the firebox, and coupled, at its front end, to the main frame; a bearing abutting on the truck frame; a rear driving wheel spring; a longitudinally extending tension rod; and bell cranks, coupling said tension rod to the truck frame bearing and to the driving wheel spring, respectively.

5. In a locomotive engine, the combination of a main frame; driving wheels journaled in bearings therein; a boiler supported on the main frame and having its firebox back of the rear driving wheels; a four wheeled truck, located below the firebox, and coupled, at its front end, to the main frame; a resistance device mounted on the truck frame for controlling the swinging movements of the truck and returning it to normal central position; a rear driving wheel spring; a longitudinally extending tension rod; and bell cranks, coupling said tension rod to a member of the resistance device and to the driving wheel spring, respectively.

FRANCIS J. COLE.

Witnesses:
G. D. SMITH,
R. E. JEFFREY.